Dec. 28, 1937.  H. C. PIERLE  2,103,298
MULTIPLE SPINDLE CENTER DRIVE CRANKSHAFT LATHE
Filed Oct. 5, 1936  9 Sheets-Sheet 1

INVENTOR.
HENRY C. PIERLE.
BY Allen & Allen
ATTORNEYS.

Dec. 28, 1937.  H. C. PIERLE  2,103,298
MULTIPLE SPINDLE CENTER DRIVE CRANKSHAFT LATHE
Filed Oct. 5, 1936  9 Sheets-Sheet 4

INVENTOR.
HENRY C. PIERLE
BY Allen & Allen
ATTORNEYS.

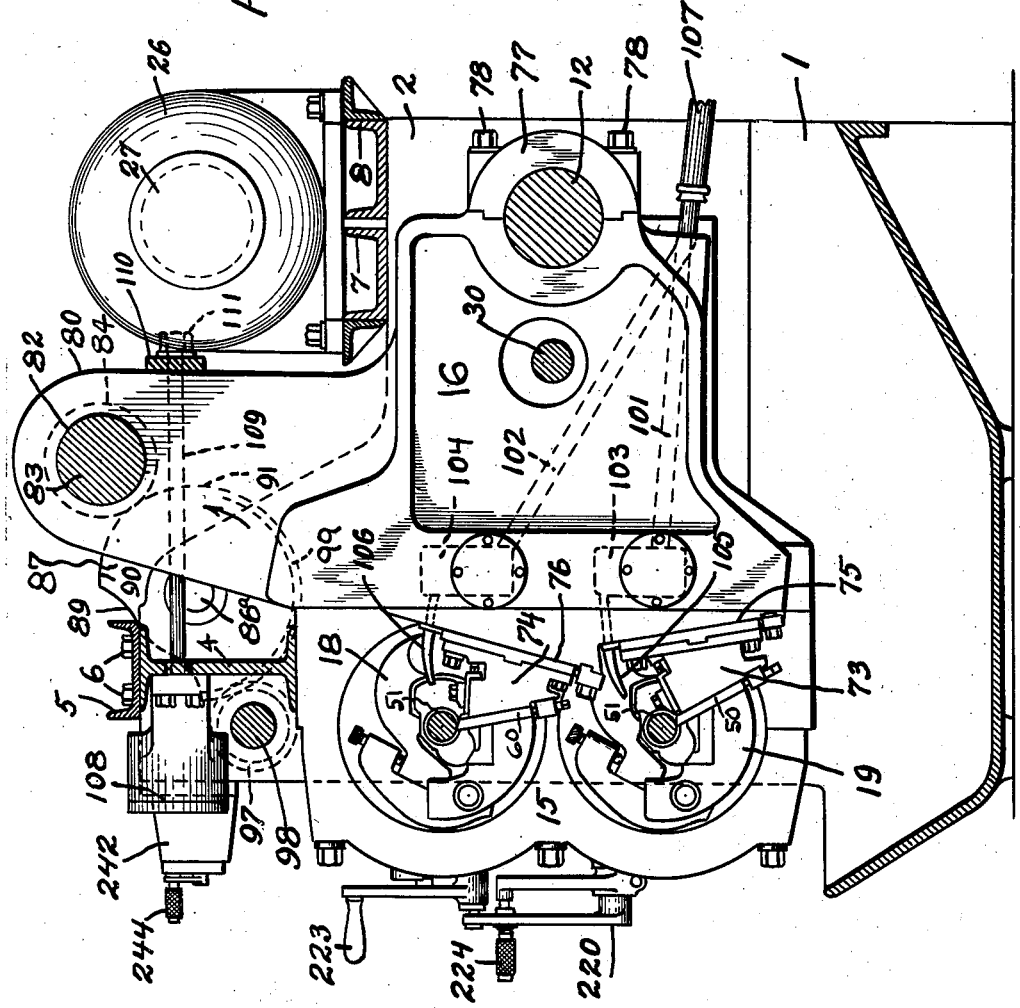

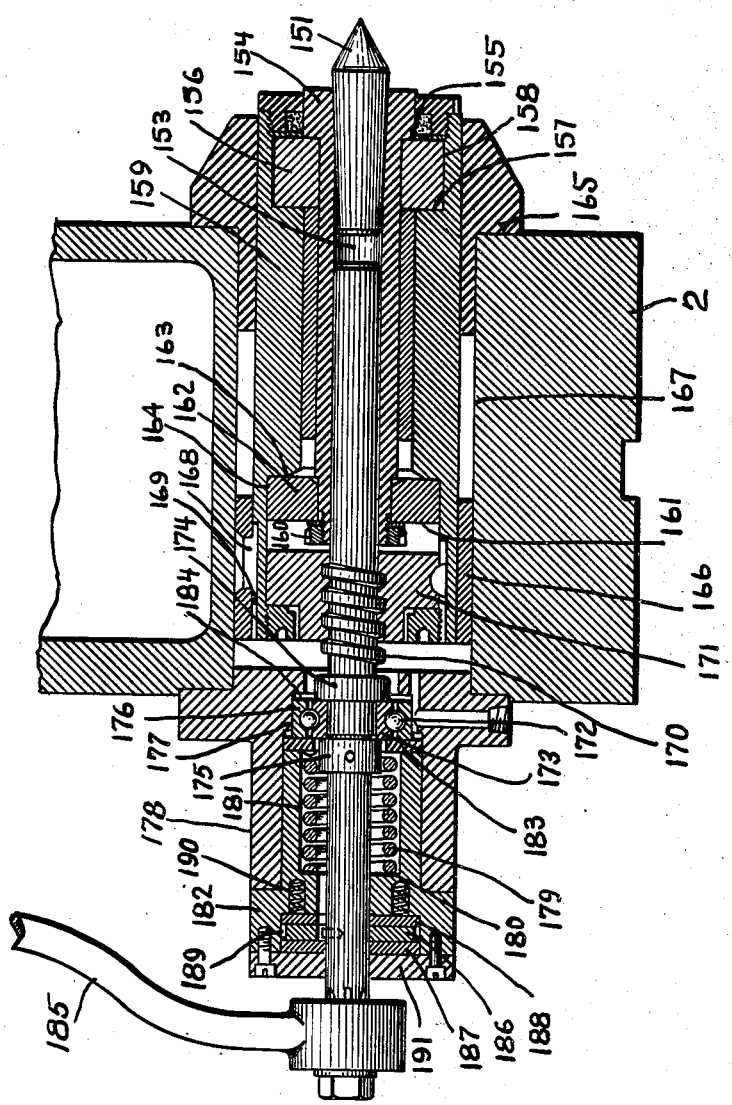

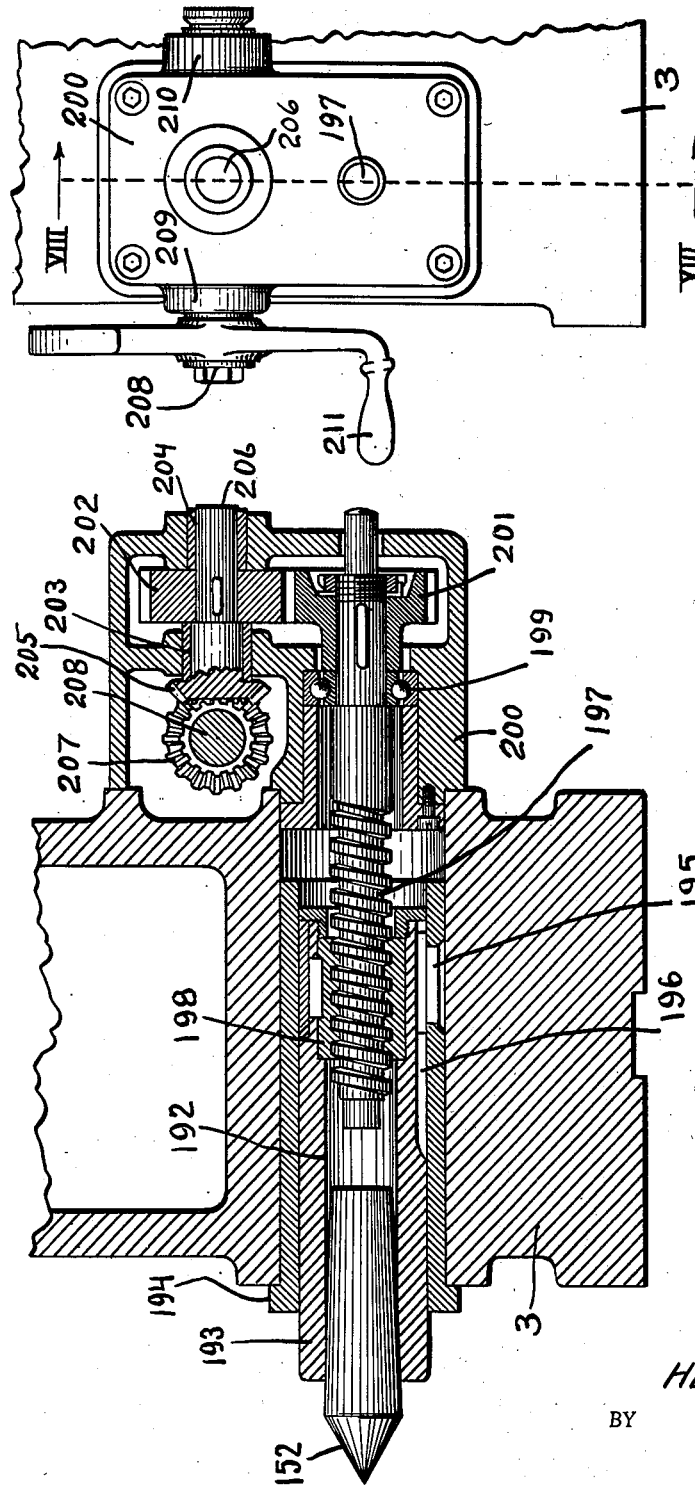

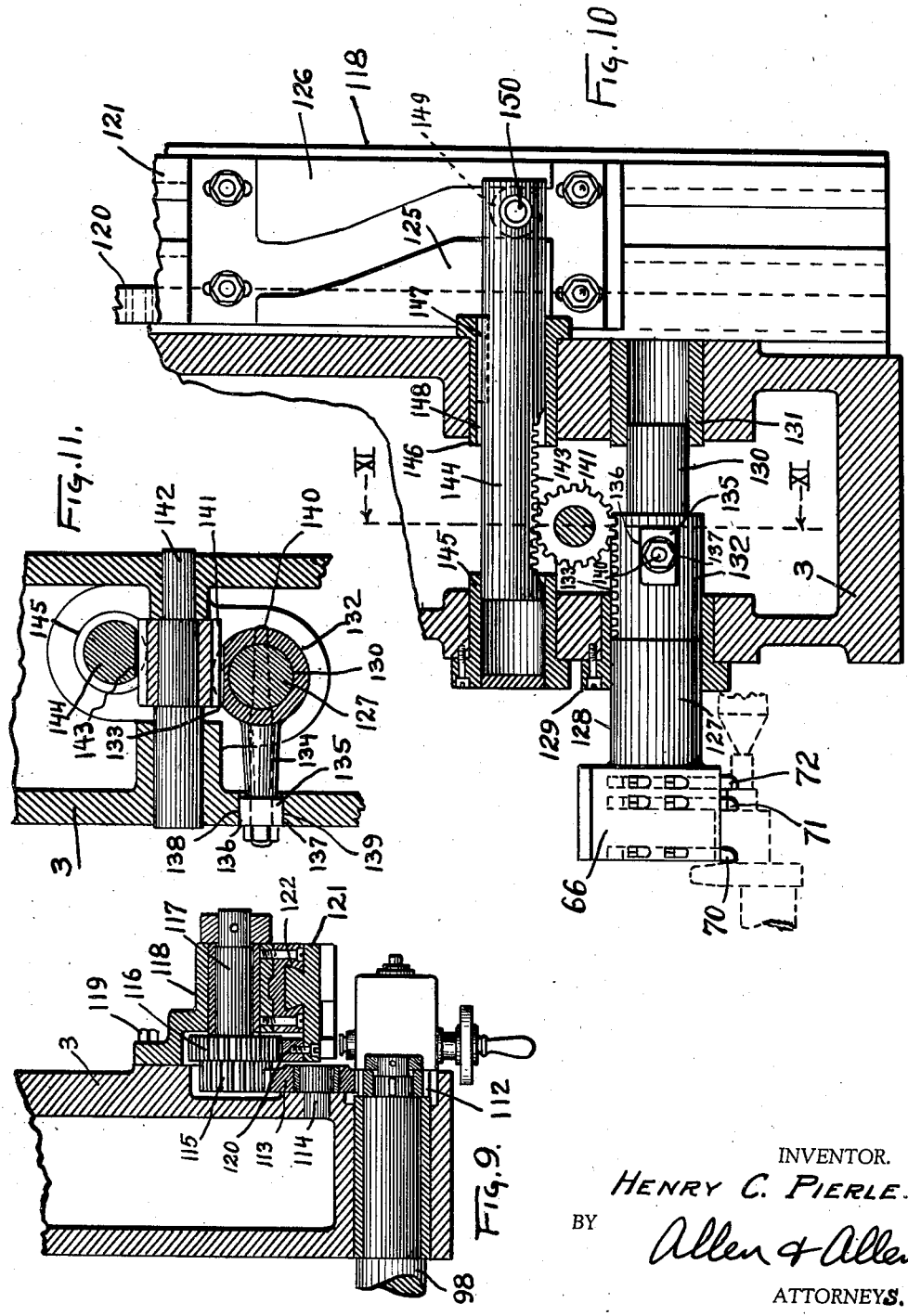

Patented Dec. 28, 1937

2,103,298

UNITED STATES PATENT OFFICE 2,103,298

MULTIPLE SPINDLE CENTER DRIVE CRANKSHAFT LATHE

Henry C. Pierle, Cincinnati, Ohio, assignor to The R. K. Le Blond Machine Tool Company, Cincinnati, Ohio, a corporation of Delaware Application October 5, 1936, Serial No. 104,037

31 Claims. (Cl. 82—9)

My invention pertains to center drive lathes, particularly to center drive lathes for machining the line bearings and associated surfaces of crankshafts. Heretofore, the method of machining the line bearings and associated portions of crankshafts was followed by first placing the work in a single spindle center drive lathe, of a character shown in application, Serial No. 20,220, filed May 7, 1935, and rough turning these portions of the work. The work was then removed from the rough turning lathe and placed in a similar lathe wherein the work was finish turned. It occurred to me that it would be highly desirable to combine these two operations in a single machine, since this would eliminate excessive handling of the work, decrease the number of machines required for a given amount of productive output, cut down on the plant floor space required and consequently the overhead involved, and otherwise greatly increase the efficiency of machining the line bearings and associated surfaces of crankshaft as compared with former methods.

An object of my invention is to provide a multiple spindle center drive lathe wherein machining operations may be simultaneously undertaken on a plurality of work pieces.

Another object is to provide a multiple spindle center drive lathe for simultaneously machining the line bearings and associated surfaces of a plurality of crankshafts.

Another object is to provide a multiple spindle lathe wherein the flange end, the stub end, and all the line bearings may be simultaneously machined on a plurality of crankshafts.

A further object of my invention is to construct a multiple spindle center drive lathe in which some of the spindles are employed for roughing operations and others of the spindles are employed for finishing operations.

It is also my object to provide tooling in a multiple spindle center drive lathe wherein, on some of the spindles, certain portions of the work pieces are completely machined, while on others of the spindles the remaining portions of work pieces are completed.

It is further my object to provide a multiple spindle center drive lathe wherein tool feeding devices may be operable to feed both longitudinally and radially of the work spindle axes.

It is also within the scope of my invention to provide a multiple spindle center drive lathe in which one or more center drive heads are provided for each spindle.

I also have devised a means for damping out vibration in the tool feeding mechanism usually set up during the machining operations.

In order more properly to locate and support the work in the lathe I have provided a unique resiliently mounted centering device for the end of the work piece.

Still another object is to provide in a lathe having a fluid pressure system for actuating the cutting tools a means for automatically lubricating the working parts of the lathe from the fluid pressure system during the operation of the lathe.

These and other objects of my invention which will be set forth hereinafter or will be clear to one skilled in the art upon reading these specifications I accomplish by that certain construction and arrangement of parts of which I shall now set forth an exemplary embodiment. Reference is made to the accompanying drawings in which:

Figure 5 is an end elevation partly in section taken on the line V—V of Figure 1, showing a tool unit with its tools fully fed into the work piece.

Figure 6 is a vertical section taken on the line VI—VI of Figure 4, showing the structure of the left hand center pin operating mechanism.

Figure 7 is an enlarged view of that portion of Figure 2 which shows the right hand end of the mechanism for operating the right hand center pins.

Figure 8 is a vertical section taken on the line VIII—VIII of Figures 2 and 7, showing the structure of the right hand center pin operating mechanism.

Figure 9 is a diagrammatic sectional view taken on the line IX—IX of Figure 2, showing the driving means for actuating the cam plate slide for the longitudinally feeding tools.

Figure 10 is a diagrammatic sectional view taken on the line X—X of Figure 2, showing the means for actuating the longitudinally feeding tools from the cams on the cam plate slide.

Figure 11 is a vertical transverse section taken on the line XI—XI of Figure 10.

Figure 1:
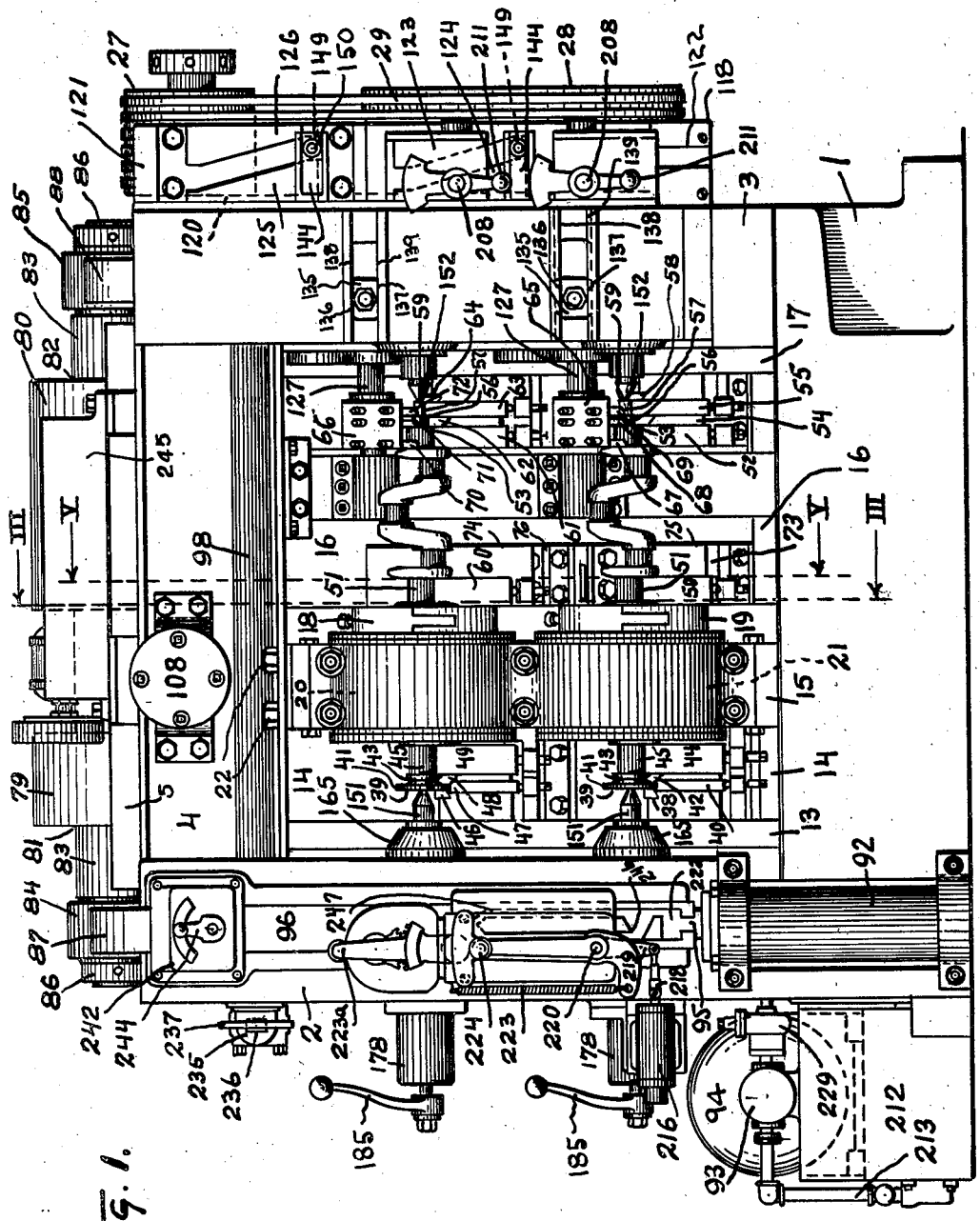
Figure 1 is a front elevation of a multiple spindle center drive lathe showing crankshafts loaded in the lathe for machining operations.

The machine comprises the base 1 upon which is mounted the left hand housing, 2, and the right hand housing, 3. Suitable means are provided to tie the upper portions of these housings together, such as the I-beam 4 and channel iron 5, located to the front of and secured to the housings, 2 and 3 by suitable bolts 6, (Figure 2) and the pair of channel irons 7 and 8 at the rear which are likewise secured to the housings 2 and 3 by suitable bolts 9.

Supported in the bore 10 in the housing 2 and in the bore 11 in the housing 3 is a relatively massive bar 12 (see especially Figure 4) which is suitably fixed from rotating in the bores 10 and 11 and serve as an additional means to tie the rear portions of the housings together.

Referring again particularly to Figure 1, intermediate the housings 2 and 3 (proceeding from left to right) the following elements are arranged: the left hand end thrust plate 13, the flange end tool unit 14, the center drive head unit 15, the intermediate line bearing and stub end unit 16, and the right hand end thrust plate 17. I have here illustrated an arrangement of a single center drive head for each spindle. The lathe is adapted for manual loading and unloading of the work piece. However, it is well within the scope of my invention to insert a second center drive head unit between the intermediate line bearing tools and the stub end tools, dividing the unit 16 into two parts, so as to provide a plurality of center drive heads for each work spindle. When such arrangement is utilized the machine may be equipped with loading and unloading mechanism, for example, the mechanism in Patent 1,700,721 issued January 29, 1929 and Patent 2,042,123 issued May 26, 1936.

Center driving mechanism

Figure 3:
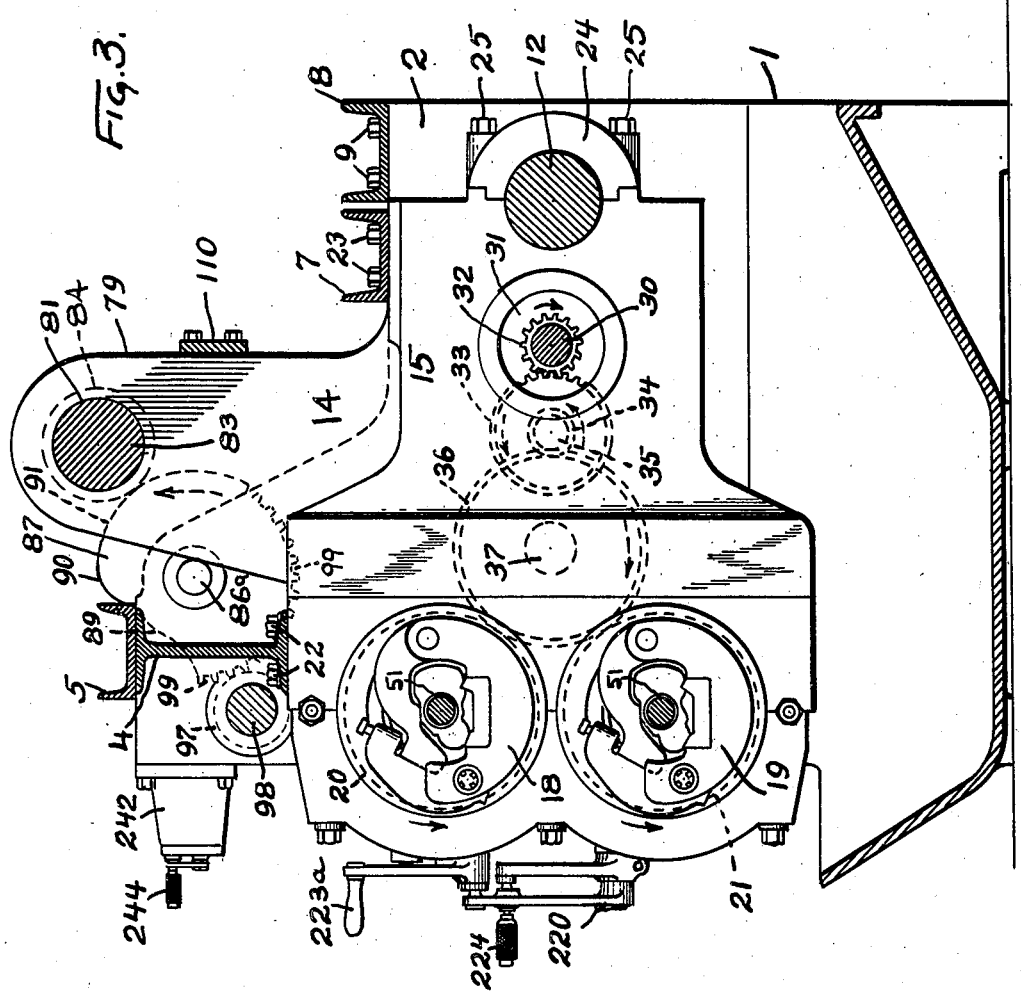
Figure 3 is a vertical section perpendicular to the work spindle axes taken on the line III—III of Figure 1 and particularly showing the center drive head unit and the driving gearing for the center drive chucks.

The work piece may be driven by the center drive chucks 18 and 19 in any usual manner, but I prefer to utilize a chucking arrangement substantially as set forth in Patent 2,030,020 issued February 4, 1936 and in application Serial No. 96,356, filed August 17, 1936. As shown in Figures 1 and 3, these chucking devices are attached to the usual ring gears 20 and 21 journaled in the head unit 15, the unit being securely fixed to the I-beam 4 by bolts 22 and to the channel iron 7 by bolts 23. (See Figure 3.) The rear portion of the unit 15 is securely clamped around the bar 12 by means of the cap 24 and fastening bolts 25. This arrangement providing an additional supporting means for the bar 12 intermediate the housings 2 and 3.

Figure 2:
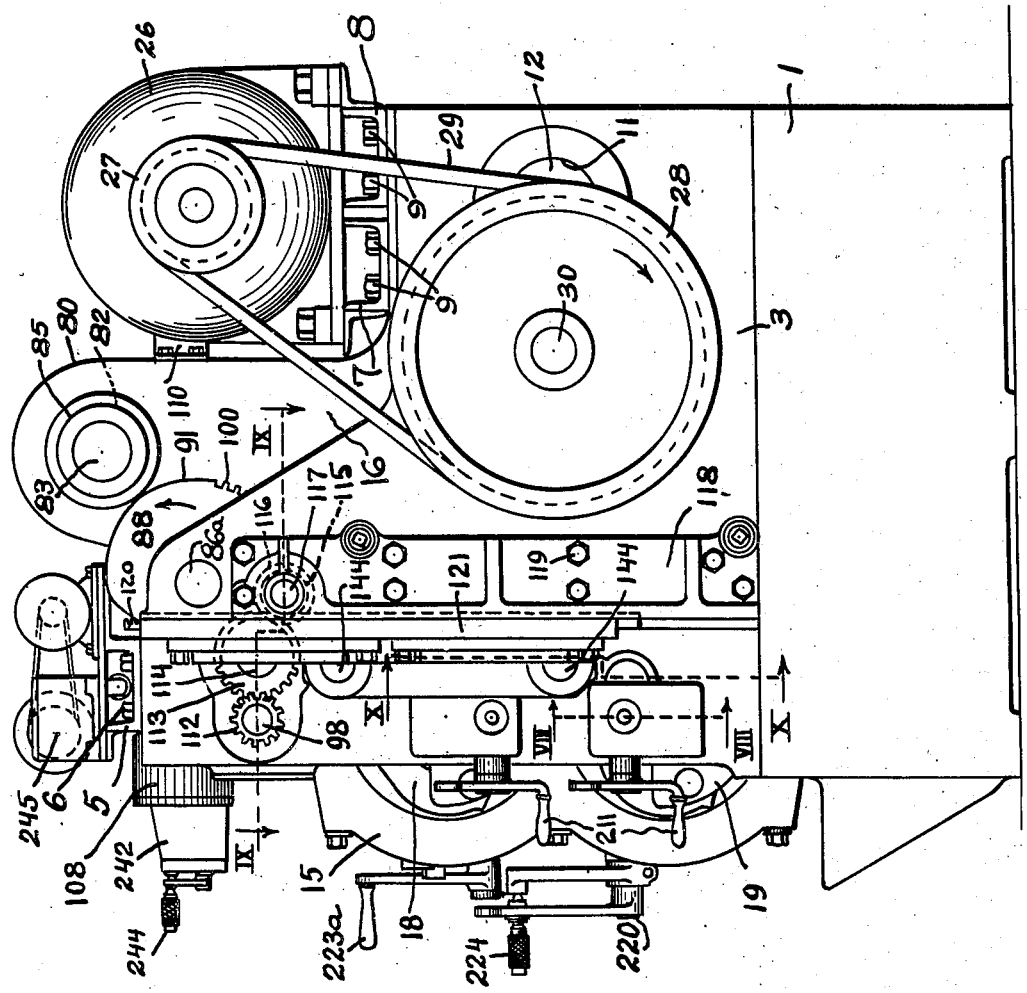
Figure 2 is a right hand end elevation of the lathe showing the motor drive for the center drive heads and the mechanism for actuating certain of the cutting tools in longitudinal feeding functions.

The power for rotating the center drive chucks is derived from the main drive motor 26, Figure 2, suitably mounted on the channel irons 7 and 8. The motor pulley 27 is preferably connected to the driving pulley 28 by the usual V-belts 29. The driving pulley 28 is fixed on a drive shaft 30 which extends longitudinally of the lathe and is journaled in suitable bearings in the housings 2 and 3. Where the shaft 30 passes through the clearance bore 31, Figure 3, in the center drive head unit 15, a pinion 32 drives the gear 33 and thereby rotates the pinion 34 of the compound gear comprising the gears 33 and 34. The compound gear is journaled on a suitable stud 35 fixed in the unit 15. The pinion 34 of this combination in turn drives the idler gear 36 which is rotatably mounted on a suitable stud 37 fixed in the head unit 15. The idler gear engages the ring gears 20 and 21 of the respective chucks 18 and 19, so that upon rotation of the motor 26 the chucks are likewise rotated and at appropriate speeds. If the ring gears 20 and 21 are of equal size the chucks will, of course, be rotated in synchronism. This is desirable when both spindles are doing the same type of machining operation. However, in cases where different types of work are done on the spindles, as for example, when roughing is done on one and finishing on the other, it may be desirable to rotate the chucks at different speeds. This may readily be accomplished by properly proportioning the relative size of the gears 20 and 21.

Tool feeding mechanism

Adjacent each side of the center drive head unit 15 are the tool units 14 and 16 arranged to feed the tools radially of the axis of the work pieces for performing forming operations on the work. In the exemplary embodiment herein described, and with reference to Figure 1, I show my invention applied to the machining of the line bearings and the flange and stub ends of a typical 6-throw, 3-line-bearing crankshaft.

On the tool unit 14 are located the following cutting tools: For the lower spindle, the tool 38 machines the outside face 39 of the flange 41; the tool 40 machines the outside diameter of the flange 41; the tool 42 machines the oil groove 43; and the tool 44 machines the flange end line bearing 45. For the upper spindle, the tool 46 machines the outside face 39 of the flange 41; the tool 47 machines the outside diameter of the flange 41; the tool 48 machines the oil groove 43; and the tool 49 machines the flange end line bearing 45.

On the tool unit 16 are located the following cutting tools:

For the lower spindle, the tool 50 machines the intermediate line bearing 51; the tool 52 machines the stub end line bearing 53; the tools 54 and 55 machine the stub end portions 56 and 57; and the tool 58 faces the end 59 of the shaft. For the upper spindle, the tool 60 machines the intermediate line bearing 51; the tool 61 machines the stub end line bearing 53; the tools 62 and 63 machine the stub end portions 56 and 57; and the tool 64 faces the stub end 59 of the shaft.

I also provide means for actuating tools longitudinally of the axis of the work to perform turning operations on the work piece. For this purpose I provide tool holders 65 and 66, having appropriate turning tools 67, 68, and 69, and 70, 71, and 72, respectively, for machining the stub end portions of the crankshaft. While I have shown in this exemplary embodiment turning tools applied only on the stub end of the shaft, it will be understood to be within the scope of my invention to apply similar turning tools to the intermediate line bearing (or bearings) and the flange end portions of crankshafts when the nature of the work piece demands such an arrangement. It is to be noted that by such structure I apply cutting tools to both sides of a plurality of work pieces being simultaneously turned in a multiple spindle center drive lathe.

There are various arrangements of machining methods available in the machine of my invention:

One arrangement is to have the cutting tools for both work spindles precisely the same whereby identical machining operations may be carried on simultaneously on both work spindles. For example both spindles may be arranged for rough machining, or both spindles may be arranged for finish machining operations on the work pieces.

Another exemplary arrangement is to have the tools of the lower spindle arranged for rough machining operations and the tools for the upper spindle arranged for finish machining operations, whereby rough and finish turning operations may be carried on simultaneously in the lathe. When this arrangement is used, a rough work piece is preferably loaded into the lower spindle. After rough machining, the work piece so treated is then transferred from the lower to the upper spindle, whereupon finishing operations are performed while roughing operations are undertaken on additional rough work pieces placed in the lower spindle. I am thus able to combine the line bearing turning operations, which heretofore required two machines, into a single machine.

Still another arrangement is to have, for example, the tools 44, 50, and 52 completely cheek and fillet the faces of the webs adjacent to the line bearings 45, 51, and 53 of the crankshaft, and to have the tools of the upper spindle finish machine the line bearing diameters and flange and stub end portions of the crankshaft. I thus provide means whereby certain portions of the work piece may be completely machined on one spindle while at the same time other portions of the work piece may be completely machined on another spindle.

And a further mode of operations is to provide tools at one spindle which will feed radially of the axis of the work only to perform forming operations, while the tools at the other spindle are adapted to feed longitudinally of the work to perform turning operations on the work.

As shown in Figure 5, the tool units 14 and 16, have appropriate tool holders, such as the holders 73 and 74, mounted on the front faces 75 and 76 of the units. These tool units are pivotally mounted on the bar 12, and are held thereon by means of a cap 77 and appropriate bolts 78. The units 14 and 16 have massive upwardly projecting arms 79 and 80, respectively, having bores 81 and 82 in the upper ends of said arms through which passes the roller bar 83. This bar 83 is fixed in the bores 81 and 82 against both axial and rotary movements and has rollers 84 and 85 properly mounted on the projecting ends 86a of the bar 83.

The feed cam shafts 86 are journaled in bearings in the housings 2 and 4 and have the peripheral feeding cams 87 and 88 fixed thereon in proper spaces in each of the housings. These cams have identical peripheries and are arranged to rotate together. The cams have coarse feed portions 89, fine feed portions 90 and dwell portions 91. The cams, of course, bear against the rollers 84 and 85 so that upon rotation of the cams 87 and 88, the arms 79 and 80 will be moved backward and upward, swinging the tool units about the bar 12 whereby to feed the tools toward or away from the work. The cams also have gear segments indicated at 99 and 100.

The power for rotating the cams 87 and 88 may be derived from any suitable source. For example, I have shown a hydraulic feed cylinder 92, Figures 4 and 12, which the piston 232 is caused to reciprocate by properly applying hydraulic fluid pressure from a hydraulic pump 93 driven by a motor 94 in a usual manner. Connected to the piston rod 95 of cylinder 92 is a reciprocatable rack 96, held in appropriate guideways in the front of the housing column 2. This rack engages a gear 97 fixed on the cam drive shaft 98 journaled in the housings 2 and 3. The gear 97 engages the gear segment 99 of the cam 87 and a gear (not shown) identically the same as gear 97 and mounted on the shaft 98 in housing 3, likewise engages the gear segment 100 of the cam 88 so that upon rotation gear 97 (caused by the movement of the rack 86) both cams 87 and 88 will be rotated in synchronism.

The cooling medium supply to the cutting tools (note Figure 5) is distributed through the passageways 101 and 102 to the chambers 103 and 104 in the tool units 14 and 16. Suitable distributing nozzles 105 and 106 communicate with these chambers 103 and 104 to deliver the coolant to the cutting tools. Suitable flexible connections 107 connect the passages 101 and 102 to the usual coolant supply in such a manner as to allow free pivotal motion of the tool units 14 and 16.

I provide a novel mechanism for damping out vibration of the cutting tools and tool units. This comprises a hydraulic cylinder 108 (best shown in Figure 5) mounted on the I-beam 4. It has a piston rod 109 extending rearwardly and through a plate 110 fixed on the rear of the arms 79 and 80 of the tool units 14 and 16. Suitable means, such as the nut 111 on the end of the piston rod 109, is provided whereby the rod 109, when drawn into the cylinder 108 by properly applying fluid pressure to cylinder 108, causes the arms 79 and 80 to be drawn forward to hold the rollers 84 and 85 snugly against the respective cams 87 and 88 at all times during the final stages of feeding of the tools upon the work piece. This arrangement also assures the positive return of the tool units and the withdrawal of the tools from the work piece when the cams have been rotated to initial starting and rapid traverse positions, should the normal force of gravity be insufficient to do this.

The mechanism for actuating the longitudinally feeding or turning tools, is particularly shown in Figures 1, 2, 9, 10, and 11. On the right hand end of the cam drive shaft 98 is fixed a gear 112 which drives the idler gear 113 rotatably mounted on the stud 114 fixed in the side of the housing 3. The idler gear 113 in turn drives the gear 115 which gear is formed integral with the gear 116, both of which gears are rotatably mounted on the stud 117 fixed in the cam plate bracket 118 bolted to the right hand side of the housing 3 by bolts 119. The gear engages a rack 120 attached to the cam plate slide 121 so that the slide 121 may be reciprocated in the dove-tail guideways 122 attached to the cam plate bracket 118.

On the cam plate slide 121 are fixed cams 123 and 124 for actuating the tool holder 65 and cams 125 and 126 for actuating the tool holder 66. Since the mechanism connecting these cams to the respective two holders is the same in both cases it will suffice to describe the structure for only one of the tool holders; for instance the tool holder 66. The tool holder 66 is mounted on an axially reciprocatable member 127 which member has a large bearing portion 128 fitted in a bearing 129 in the housing 3 and a smaller bearing portion 130 fitted in the bearing 131 also in the housing 3 (see Figure 10). On the portion 130 and adjacent to the portion 128 of the member 127 is fixed a rack piece 132 which has the rack 133 formed integral therewith and also has a torque arm 134 formed integral therewith, which arm has a squared end portion 135 having parallel faces 136 and 137 which slidingly fit between suitable mating guides 138 and 139, (Figures 1 and 11) fixed on the housing 3. A tapered pull pin 140 passes through the arm 134 and through the members 132 and 127 thereby securing the members together. The purpose of this arrangement is to permit axial movement of the member 127 and its tool holder 66, while at the same time preventing any rotation of the member 127 in the bearings 129 and 131.

Engaging the rack 133 is an idler gear 141 rotatably mounted on the stud 142 fixed in the housing 3, which gear 141 also engages the rack 143 in the roller bar 144. The bar 144 is mounted for axial reciprocation in the bearings 145 and 146 in the housing 3, and is prevented from rotating by suitable means such as the key 147 fixed in the bar 144 slidingly engaging the keyway 148 in the bearing 146. On the outer projecting end of the bar 144 is mounted the usual cam roller 149 on the stud 150, the roller 149 operating between the cams 125 and 126 in such a way as to cause reciprocation of the bar 144; the cams 125 and 126 being reciprocated by the means already described. It is thus apparent that reciprocation of the bar 144 will cause opposite reciprocation of the member 127 through the rack 143, the idler gear 141 and the rack 133. By this arrangement I am thus able to provide tools with a movement suitable for performing turning operations on the work piece. Noting particularly Figure 1, I have by this arrangement and the forming tools described above provided means whereby cutting tools may be caused to operate on both sides of the work pieces.

*Tailstock centering mechanism*

In order to assist the center drive chucking devices in properly supporting the work piece in the lathe, I provide centers 151 in the housing 2 and centers 152 in the housing 3.

The centers 151 in the housing 2 are operated by mechanism shown in detail in Figure 6. The center 151 is mounted in the customary tapered bore 153 in the sleeve 154. The sleeve 154 may be rotatably mounted or may be fixed from rotating relative to the housing 2. As is shown in Figure 6; the face 155 of the sleeve 154 is drawn tightly against the bushing 156 which in turn bears against the bottom 157 of the counter bore 158 of the axially reciprocable sleeve 159. Threaded on the inner end of the sleeve 154 is a lock nut 160 which bears against the face 161 of the bushing 162 and holds the bushing 162 against the bottom 163 of the counter bore 164 and also draws the face 155 of the sleeve 154 against the bushing 156 so as to fix the sleeve 154 securely to the sleeve 159. The sleeve 159 has axial reciprocation in the bushing 165 and 166 fixed in the bore 167 of the housing 2. A suitable key 168 fixed in the bushing 166 and operating in the keyway 169, in the sleeve 159, prevents all rotation of the sleeve 159 as the work rotates on the center 151.

A suitable screw 170 operating in the nut 171 fixed in the sleeve 159 is utilized to move the sleeve 159 and center 151 axially. The screw is preferably mounted in such a way as to permit a limited amount of restricted axial float of the screw relative to the housing 2. A ball bearing 172, adapted to receive loads in all directions, has its inner race 173 securely fixed on the screw between the shoulder 174 and the collar 175 fixed on the screw. The outer race 176 of the ball bearing 172 is mounted, with some axial float, in the bore 177 of the hub 178 attached to the outside of the housing 2. A suitable resilient means such as the spring 179 confined between the bottom 180 of the bore 181 of the cap 182 fixed to the hub 178 and the collar 183 which contacts the outer race 176, of the bearing 172 serves at all times to urge the bearing and its screw 170 to the right (Figure 6) normally keeping the outer race in contact with the bottom 184 of the bore 177 when no work is mounted on the center 151. A manipulating lever 185 is suitably fixed on the outer end of the screw 170 for manual rotation. When work is mounted in the lathe and confined between the centers 151 and 152 the lever 185 is operated to rotate the screw 170 beyond what is necessary initially to engage the center 151 in the center hold in the work piece. The results of this is to force the screw 170 and bearing 172 axially to the left (Figure 6) compressing the spring 179. With the center 151 being thus constantly urged into the center hole in the work the work piece is ready to be operated upon. The advantage of this arrangement is that, should the center 151 or the center hole in the work piece wear, the spring 179 will immediately take up this wear by automatically moving the center into the center hole of the work, thus preventing looseness of the work on the centers and consequent inaccuracy and damage to the work.

In order yieldingly to hold the lever 185 in any selected position I provide a friction device comprising a disc 186 mounted to rotate with the screw 170 and a pair of friction discs 187 and 188 arranged in the counter bore 189 in the end of the cap 182. A plurality of springs 190 in the bottom of the counter bore 189 serve yieldingly to urge the discs 186, 187, and 188 into contact at all times against the cover plate 191 fixed to the cap 182. The springs 190 are so designed as to set up sufficient friction in the discs to prevent movement of the lever 185 under the influence of gravity or machine vibration for any selected position, while at the same time permitting easy manipulation of the lever 185 at any time.

The centers 152 in the right hand housing 3 are operated by the mechanism shown in Figures 7 and 8. The center 152 is carried in the tapered bore 192 in the usual barrel 193 arranged for axial reciprocation in the sleeve 194 fixed in the housing 3. A suitable key 195, fixed in the sleeve 194 and slidingly engaging the keyway 196 in the barrel 193, serves to prevent rotation of the barrel and the center relative to the housing 3. The actuating screw 197, operating in the nut 198 fixed in the rear of the sleeve 193, is rotatably mounted on the ball bearing 199 fixed in the bracket 2 or attached to the housing 3, so that the screw will have substantially no axial float relative to the housing 3. Fixed to the outer end of the screw is a gear 201 which engages the gear 202 on the bevel gear shaft 206 journaled in bearings 203 and 204 in the bracket 200. The bevel gear 205 formed integral with the shaft 206 engages the bevel gear 207 fixed on the hand wheel shaft 208 mounted in suitable bearings 209 and 210 in the bracket 200. Suitable hand wheels 211 are mounted on the shafts 208, conveniently placed at the front of the housing 3, for easy manipulation by the operator.

Control mechanism

Figure 12:
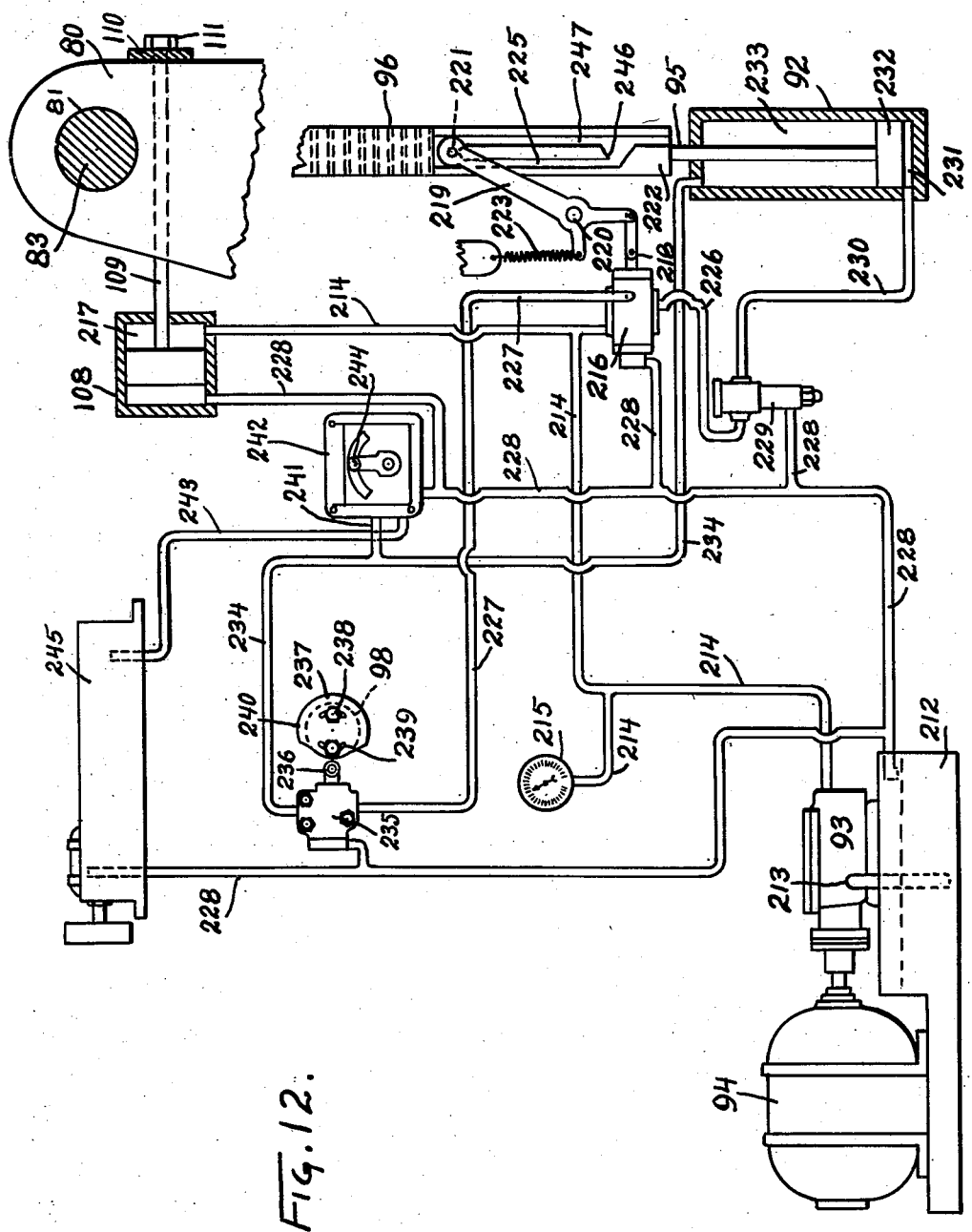
Figure 12 is a diagram illustrating the functions and operation of the fluid pressure system for actuating the cutting tools.

The hydraulic control circuit is diagrammatically shown in Figure 12. During the normal operation of the lathe, the motor 94 is constantly running and driving the hydraulic pump 93 which draws fluid from the reservoir 212 through the line 213 and constantly delivers it under relatively high pressure into the line 214. Connected to this line is the usual pressure gage 215, and the main control valve 216. The piston rod chamber 217 of the cylinder 108 is also connected to the line 214 so that at all times the rod 109 is being urged into the cylinder 108 during the operation of the lathe.

The plunger 218 of valve 216 is connected to a lever 219 pivotally mounted on the stud 220 on the housing 2. This lever 219 has a suitable pin 221 at its outer end which engages in the slots of the feed control cam plate 222 fixed to the reciprocatable rack 96 so as to move therewith. A spring 223 connecting the lever 219 and the housing 2 yieldingly urges the lever to the right relative to the cam plate 222 as seen in Figures 1 and 12; the lever 219 and its pin 221 are shown in neutral position at the beginning of a machining cycle in Figure 12.

After the work has been chucked in the lathe the electric control switch handle 223, (Figure 1) is moved to the left, setting the spindles rotating, the lever 219 is then moved to the left by means of the feed control handle 224 thus moving the pin 221 of the lever 219 in alignment with the forward traverse and feed slot 225 of the cam plate 222. Moving the lever 219 to the left in this manner moves the plunger 218 of valve 216 so that line 214 is connected to line 226 and line 227 is connected to the drain line 228. Fluid pressure thereby is delivered from the line 214 through the valve 216, the line 226, the one way metering valve 229, and the line 230 to the piston head chamber 231 of the feed cylinder 92. The valve 229, under these conditions, is ineffective and permits free flow of fluid from valve 216 to chamber 231.

The piston 232 and rod 95 of cylinder 92 are thereby raised at a relatively rapid rate for rapid traverse of the tools to the work by the mechanism already described. The pin 221 thereby enters the slot 225 of the cam plate 222 as it is raised by the movement of the rack 96, thus relieving the operator immediately of the necessity of holding the feed lever 224 to left against the spring 223 in order to maintain the feeding of the tools.

Figure 4:
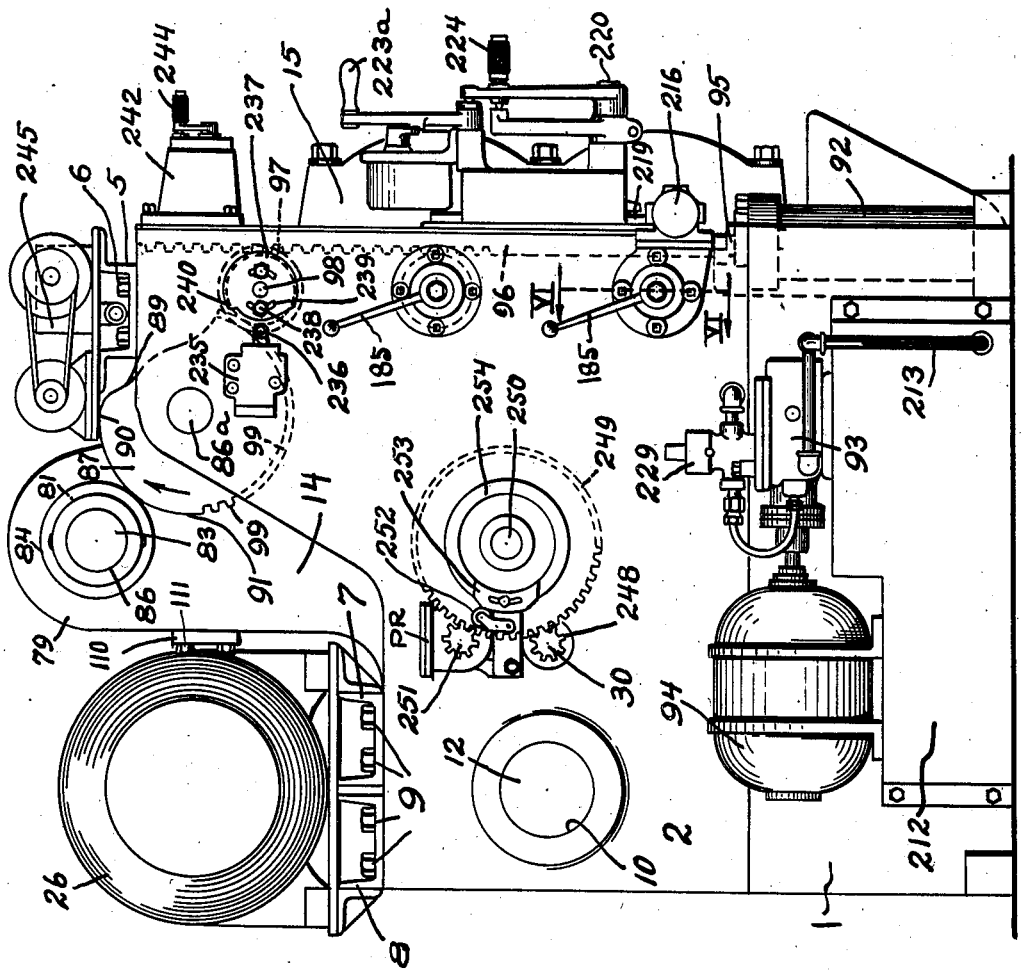
Figure 4 is a left hand end elevation of the lathe showing the mechanical and hydraulic feeding mechanism for actuating the tool units.

During the first stages of the movement of the piston 232 up the cylinder 92, fluid is allowed to escape relatively rapidly from the piston rod chamber 233 through the line 234, the automatic rapid traverse cutoff valve 235, the line 227, the valve 216, and into the drain line 228 thereby permitting forward rapid traverse of the tools as described. Normally the plunger 236 of valve 235 is extended so as to provide free flow of the liquid from line 234 into line 227. On the end of the cam drive shaft 98, where it projects through the housing 2, Figure 4, is fixed a circular cam 237 by means of screws 238 which pass through elongated arcuate slots 239 in the cam 237. The purpose of these slots 239 is to permit relative circumferential adjustment of the cam 237 on the shaft 98. On the cam 237 is a lobe 240 which is adapted to contact the plunger 236 of valve 235 upon rotation of shaft 98 so as to shut off flow of fluid from line 234 into line 227. It can thus be seen that since the shaft 98 is rotated by the operation of the feed cylinder 92 as described the lobe 240 of the cam 237 can be adjusted to contact the plunger 236 at any predetermined position of the stroke of the cylinder 92 by proper setting of the cam 237 on the shaft 98.

When the plunger 236 of valve 235 is depressed, closing off the line 234, the fluid escaping from the chamber 233 must all pass through the line 241, through the adjustable metering or feed rate control valve 242, and then into the drain line 243. The valve 242 greatly restricts the flow of fluid so that the piston 232 rises only at a very slow rate to produce feeding movement of the tools to the work. A suitable manual control handle 244 is provided on the valve 242 for easy selection of the desired rate of feed on the part of the operator.

A novel feature of this arrangement is that the discharge from the valve 242 through the line 243 does not go directly to the drain line 228, but first enters the lubricating device 245 for the working parts of the lathe. Thus the device is kept constantly supplied with lubricating fluid without any attention upon the part of the operator and positive lubrication of the machine is assured at all times during its operation. The excess fluid in the lubricating device escapes through the drain line 228. I thereby provide an arrangement in which all the working parts of the lathe are automatically lubricated by the fluid pressure system for actuating the tool feed mechanism.

Toward the end of the feeding movement the tools are caused to dwell upon the work pieces for proper sizing by the dwell portions 91 of the feed cams 87 and 88 as has been described, the cylinder 92 continuing in its forward motion until the pin 221 of the lever 219 leaves the slot 225 passing the point 246 of the cam plate 222, and moving to the right in alignment with the rapid traverse slot 247 under the influence of the spring 223 whereupon the plunger 218 of valve 216 is shifted to the left, Figure 12, so as to connect line 124 with line 227 and line 226 with line 228. Under these conditions fluid pressure from line 214 passes through valve 216, line 227, valve 235, line 234, and into the chamber 233 of cylinder 92 to rapidly return the piston 232 downward, returning the tools in rapid traverse. The valve 235 is so arranged that free flow is permitted at all times from the line 227 into the line 234 even though its plunger 236 be depressed by the cam 237 as at the beginning of the rapid traverse return movement. The valve 229 acts as an automatic metering valve to prevent too rapid a flow of fluid from chamber 231, through line 230, into the line 226, the valve 216 and the drain 228, so as to prevent too rapid a return of the piston 232 to the bottom of the cylinder 92.

I provide means for manually operating the valve 216 independently of the cam plate 222 and also mechanism for interlocking the spindle control and feed control mechanism of a character substantially as fully disclosed in Patents Reissue 18,662 and Reissue 19,905.

I further provide means for accurately stopping the work spindles in a predetermined position, to facilitate loading and unloading of the work, substantially as set forth in application Serial Number 20,220, filed May 7, 1935. Noting Figure 4, the plugging relay PR and limit switch LS—4 are mounted on the housing 2. On the end of the shaft 30 where it projects through the housing 2 is mounted the pinion 248 which drives the gear 249 rotatably mounted on a suitable stud 250 fixed in the housing 2. The ratio of the pinion 248 and the gear 249 is such that the gear 249 at all times rotates in synchronism with the center drive ring gears 20 and 21. The plugging relay PR has a gear 251 fixed on its shaft which is driven from the gear 249. The limit switch LS—4 has its actuating arm 252 operated by the cam 253 on the hub 254 of gear 249. The functioning of these switches is fully described in the above mentioned patent application and will therefore not be described here.

Having thus fully described my invention, what I claim as new and desire to secure by Letters Patent is:—

1. In a machine tool of the class described, a series of center drive chucking devices with their axes interspaced substantially parallel and arranged substantially in a plane, tool carriers arranged along said axes on each side of said chucking devices, series of tools on the respective carriers, also arranged substantially in said plane, and means whereby said tool carriers are moved in said plane substantially at right angles to the axes of said chucking devices.

2. In a machine tool, a series of center drive chucks with their axes arranged substantially in a plane, the axes of some of said chucks being interspaced tool carriers arranged along said axes some between and others on each side of said chucks, series of tools on the respective carriers also arranged substantially in said plane, and means whereby said tool carriers are moved in said plane substantially at right angles to the axes of said chucks.

3. In a machine tool for simultaneously machining a plurality of work pieces, a series of center drive chucking devices rotating on parallel interspaced axes, a tool carrier swinging in a plane at right angles to each of said axes, a series of tools on said carrier, one for the work in each chucking device, said tools and said chucking devices being arranged closely along a single arc of swinging of said tool carrier, and means for swinging said tool carrier so as to feed said tools to the work.

4. In a machine tool for simultaneously machining a plurality of work pieces, a series of center drive chucking devices rotating on parallel interspaced axes, a tool carrier, a series of tools on said carrier, one for each such chucking device, and means to cause relative movement of the chucking devices and the tool carrier so as to cause feeding or withdrawal of the tools relative to all work pieces in said chucking devices.

5. In a machine tool of the character described, a series of center drive chucking devices rotating on parallel interspaced axes, a tool carrier, a series of tools on said carrier, one for each such chucking device, and means to cause relative movement of the chucking devices and the tool carrier in an arcuate path to cause feeding or withdrawal of the tools relative to all work pieces in said chucking devices.

6. In a multiple spindle crankshaft lathe for cutting a series of line bearings simultaneously on a series of crankshafts, the combination of a series of axially interspaced chucks arranged in a desired line to support and rotate a series of crankshafts in said line with each other, a series of tool holders arranged in a series in a right angle plane to the axes of the crankshafts to be cut, and a series of tools on each tool holder arranged in a like line with the series of chucks, and means for causing relative feeding of the tools and the crankshafts in said chucks by movement substantially along said line.

7. In a multiple spindle crankshaft lathe for cutting a series of line bearings simultaneously on a series of crankshafts, the combination of a series of axially interspaced chucks arranged in desired lines to support and rotate a series of crankshafts in said lines with each other, a series of tool holders arranged in a plane at right angles to the axes of the crankshafts to be cut, a series of tools on each tool holder arranged in a like line with the series of chucks, and means for effecting a relative bodily movement of the chucks as a unit and the tool holders as a unit substantially along said line.

8. In a multiple spindle crankshaft lathe, means for supporting and revolving in axially interspaced arrangement a plurality of crankshafts to be turned from a position between the ends of the shafts, cutting tools for each of said crankshafts, and common means for feeding said cutting tools so as to turn all of the line bearings of said crankshafts at a single operation.

9. In a multiple spindle crankshaft lathe, means for supporting and revolving in axially interspaced arrangement a plurality of crankshafts to be turned from a position between the ends of the shafts, cutting tools for each of said crankshafts and interconnected means for feeding said cutting tools so as to turn all of the line bearings of said crankshafts at a single operation, said tools being so arranged as to engage the line bearings of said crankshafts from opposite sides with relation to each line bearing.

10. In a multiple spindle center drive lathe, upper and lower spindles each comprising means for driving a work piece intermediate its ends and having centering means for the ends of said work piece, tool carriers, tools on said tool carriers, and common means to move said tool carriers to cause simultaneous feeding of said tools relative to work pieces in said spindles.

11. In a multiple spindle center drive lathe, upper and lower spindles each comprising means for driving a work piece intermediate its ends and centering means for the ends of said work piece, tool carriers, tools on said tool carriers for each of said spindles and means to move said tool carriers to cause simultaneous feeding of said tools relative to work pieces in said spindles, said tools for one of said spindles being adapted to rough machining operations, said tools for the other said spindles being adapted to finish machining operations.

12. In a multiple spindle center drive lathe, upper and lower spindles each comprising means for driving a work piece intermediate its ends and centering means for the ends of said work piece, tool carriers, tools on said tool carriers for each of said spindles, and means to move said tool carriers to cause simultaneous feeding of said tools relative to the work pieces in said spindles, said tools for one of said spindles being adapted to completely machine certain portions of a work piece in said spindle, said tools for the other of said spindles being adapted to completely machine other portions of a work piece in said spindles.

13. In a multiple spindle crankshaft lathe, a bed, means thereon to support and revolve a plurality of crankshafts intermediate their ends, tool feeding devices to feed appropriate tools for simultaneously turning the stub end, the flange end and all of the line bearings of said crankshafts, and common driving means for simultaneously moving said tool feeding devices.

14. In a multiple spindle crankshaft lathe, means for supporting and revolving a plurality of crankshafts to be turned from a position between the ends of the shafts, cutting tools, and means for feeding them so as to turn all the line bearings of said crankshafts at a single operation, said means operating to feed certain of said tools longitudinally of the axis of rotation of the work and others of said tools radially of said axis.

15. In a lathe, a bed, spaced housings mounted on said bed, centering means in said housings, a work spindle support mounted on said bed intermediate said housings, a plurality of axially interspaced center drive chucking devices mounted in said support, means for driving said center drive chucking devices, and tool feeding devices arranged for feeding relative to said chucking devices located each side thereof and between said centering means.

16. In a lathe, a bed, spaced housings mounted on said bed, centering means in said housings, a work spindle support mounted on said bed intermediate said housings, a plurality of axially interspaced center drive chucking devices mounted in said support, means for rotating said chucking devices, a pivot member mounted in said housings, tool carriers mounted on said member and having movements in planes at right angles to said axes of said chucking devices, tools on said carriers, and means to swing said carriers so as to cause relative feeding or withdrawal of the tools and work pieces held in said chucking devices and centering means.

17. In a lathe, a bed, spaced housings mounted on each end of said bed, centering means in said housings, a plurality of work spindle supports mounted on said bed intermediate said housings, a plurality of center drive chucking devices in each of said supports, means for driving said chucking devices in synchronism, and tool feeding devices arranged to feed appropriate tools relative to said chucking devices, some of said tools being located between said housings and said supports, others of said tools being located between said supports.

18. In a multiple spindle center drive lathe, a bed, a work spindle support mounted on said bed, axially interspaced center drive ring gears journaled in said support, chucking devices mounted on said ring gears, and means to rotate said ring gears at different rates of speed.

19. In a lathe, a frame, a pivot member mounted in said frame, a tool carrier pivotally mounted for swinging movement on said member, a relatively long arm attached to said tool carrier, cam means cooperating with said arm, and means for actuating said cam means, said cam means being arranged to swing said tool carrier at rapid traverse, coarse feed, and fine feed rates and to dwell said carrier.

20. In a lathe, a bed, spaced housings mounted on said bed, centering means in said housings, a plurality of center drive chucking devices mounted between said housings, a pivot member supported in said housings, cutting tools, tool carriers pivotally mounted on said member for feeding said cutting tools relative to work pieces held in said centering means and chucking devices, projecting arms on said tool carriers, a member passing through the outer ends of said arms, cam means mounted in said housings and coacting with said last mentioned member, and means for actuating said cam means whereby said tool carriers may be simultaneously actuated.

21. In a lathe, a bed, spaced housings mounted on said bed, centering means in said housings, a plurality of center drive chucking devices mounted between said housings, a pivot member supported in said housings, cutting tools, tool carriers pivotally mounted on said member for feeding said cutting tools relative to work pieces held in said centering means and chucking devices, projecting arms on said tool carriers, a member passing through the outer ends of said arms, cam means mounted in said housings and coacting with said last mentioned member, and hydraulic means for actuating said cam means.

22. A lathe as set forth in claim 21, wherein the cam means provides the coarse feed and fine feed rates and dwell for the tool carriers and the hydraulic means provides the feed and rapid traverse movements in either direction.

23. In a lathe, a frame, a tool carrier pivotally mounted in said frame, tools on said tool carrier, coolant supply means for said tools comprising passageways extending from the rear of said carrier to chambers formed in the front of said carrier, nozzles mounted on said carrier communicating with said chambers for distributing coolant to the tools, and flexible supply means connected to said passageways to permit free pivotal movement of said carrier.

24. In a lathe, a bed, spaced housings mounted on said bed, centering means in said housings, a plurality of center drive axially interspaced chucking devices mounted between said housings, a pivot supported in said housings, cutting tools, tool carriers pivotally mounted on said member for feeding some of said tools radially of the axes of rotation of work pieces held in said centering means and chucking devices, tool carriers mounted on said housings arranged to feed others of said tools longitudinally of the axes of said work pieces, cam means for actuating said tool carriers, and hydraulic means for actuating said cam means to cause simultaneous feeding of said tool carriers.

25. In a center drive lathe, center drive chucking mechanism, and centers cooperating with said mechanism, means for manually axially reciprocating said centers for loading and unloading work in the lathe, one of said centers having means to automatically urge the center into engagement with the work piece during turning of the work piece, a manual operating lever to render said last mentioned means operative, and friction means to at all times maintain any selected position of said lever.

26. A crankshaft lathe having in combination, means for holding a crankshaft in working position, tools adapted to be fed to the crankshaft, hydraulically operated mechanical means for feeding and rapidly traversing the tools relative to the crankshaft, means to supply hydraulic pressure to said hydraulically operated means, a cam member moved by said hydraulically operated means, a valve controlling said hydraulic pressure supply means, an operative connection from said cam to said valve, a throttle valve for limiting the rate of movement of said hydraulically operated means, and means operated by the movement of the hydraulically operated means for alternately rendering said throttle valve effective or ineffective whereby to produce a feeding or rapid traverse of the tools.

27. A crankshaft lathe having in combination, means for holding a crankshaft in working position, tools adapted to be fed to the crankshaft, fluid pressure operated mechanical means for feeding said tools relative to the crankshaft, a source of supply of oil under pressure connected to said means, a lubricating device for the working parts of said lathe, and means whereby said lubricating device is supplied with oil from said source of supply of oil pressure.

28. A crankshaft lathe having in combination, a source of fluid pressure, a main control valve connected to said source, a fluid pressure cylinder, a piston reciprocable in said cylinder, tool feeding mechanism connected to said piston for feeding to or from a work piece in the lathe, a control cam connected to said piston, an operative connection between said cam and said main control valve, a throttle valve for limiting the discharge of fluid from said cylinder during the forward stroke of said piston, control means operated by the tool feeding mechanism automatically to render said throttle valve effective at a predetermined position of forward movement of said piston, and means automatically operative to limit the discharge of fluid from said cylinder during the return stroke of said piston.

29. A crankshaft lathe having in combination, a source of fluid pressure, fluid actuated tool feeding devices, means to control said source of fluid pressure so as to cause reciprocation of said tool feeding devices to and from work in the lathe, a hydraulic cylinder, a piston reciprocable in said cylinder, a mechanical connection between said piston and said tool feeding devices, and fluid conducting means between said cylinder and source of fluid pressure whereby said piston at all times yieldingly opposes the forward feeding movement of said tool feeding devices.

30. In a multiple spindle crankshaft lathe, a series of center drive chucking devices with their axes interspaced substantially parallel and arranged substantially in a plane for supporting and revolving in axially interspaced arrangement a plurality of crankshafts to be turned, cutting tools for each of said crankshafts and means for feeding said cutting tools so as to turn a plurality of line bearings of said crankshafts, said tools being arranged in said plane and adapted to engage the line bearings of said crankshafts from opposite sides with relation to each line bearing.

31. In a multiple spindle crankshaft lathe, a series of center drive chucking devices with their axes interspaced, substantially parallel and arranged substantially in a plane for supporting and revolving in axially interspaced arrangement a plurality of crankshafts to be turned, cutting tools for each of said crankshafts and common means for feeding said cutting tools so as to turn a plurality of line bearings of said crankshafts, said tools being arranged in a plane at a substantial angle to said first mentioned plane and adapted to engage the line bearings of said crankshafts from opposite sides with relation to each line bearing.

HENRY C. PIERLE.